United States Patent [19]

Ishii et al.

[11] Patent Number: 4,643,841

[45] Date of Patent: Feb. 17, 1987

[54] LIQUID-CRYSTAL COMPOSITION

[75] Inventors: Yutaka Ishii, Nara; Fumiaki Funada, Yamatokoriyama; Masataka Matsuura, Tenri, all of Japan

[73] Assignees: Sharp Kabushiki Kaisha, Osaka, Japan; Merck Patent Gesellschaft mit beschrankter Haftung, Darmstadt, Fed. Rep. of Germany

[21] Appl. No.: 642,775

[22] Filed: Aug. 21, 1984

[30] Foreign Application Priority Data

Aug. 30, 1983 [JP] Japan ............................... 58-158510

[51] Int. Cl.$^4$ ............................ C09K 3/34; G02F 1/13
[52] U.S. Cl. ............................. 252/299.61; 252/299.5; 252/299.63; 252/249.66
[58] Field of Search ........... 252/299.5, 299.61, 299.63, 252/299.66; 350/250 R

[56] References Cited

U.S. PATENT DOCUMENTS

| | | | |
|---|---|---|---|
| 4,198,130 | 4/1980 | Boller et al. ...................... | 252/299.5 |
| 4,229,315 | 10/1980 | Krause et al. .................... | 252/299.63 |
| 4,285,829 | 8/1981 | Eidenschink et al. ........... | 252/299.63 |
| 4,309,204 | 1/1982 | Harrison et al. ................ | 252/299.63 |
| 4,330,426 | 5/1982 | Eidenschink et al. ........... | 252/299.63 |
| 4,331,552 | 5/1982 | Eidenschink et al. ........... | 252/299.63 |
| 4,391,730 | 7/1983 | Kuschel et al. ................. | 252/299.63 |
| 4,398,803 | 8/1983 | Pohl et al. ....................... | 252/299.63 |
| 4,410,445 | 10/1983 | Baur et al. ....................... | 252/299.63 |
| 4,415,470 | 11/1983 | Eidenschink et al. ........... | 252/299.63 |

FOREIGN PATENT DOCUMENTS

| | | | |
|---|---|---|---|
| 2257588 | 6/1973 | Fed. Rep. of Germany ......................... | 252/299.61 |
| 55-152777 | 11/1980 | Japan ............................... | 252/299.61 |
| 56-68636 | 6/1981 | Japan ............................... | 252/299.5 |
| 57-34176 | 2/1982 | Japan ............................... | 252/299.63 |
| 2067586 | 7/1981 | United Kingdom ........... | 252/299.61 |

*Primary Examiner*—Teddy S. Gron
*Attorney, Agent, or Firm*—Birch, Stewart, Kolasch & Birch

[57] ABSTRACT

A liquid-crystal composition to be used in a multiplex-driving system in a twisted nematic (TN) type liquid-crystal display devices of the present invention is extremely superior in its display characteristics, and is able to meet sufficiently the demands to increase the information content of various liquid-crystal display devices of high-level multiplexing operation. The liquid-crystal composition is more considerable in its usefulness than the validity thereof in half-tone display especially when it is used in a liquid-crystal television.

1 Claim, 6 Drawing Figures

$\vec{r_1}, \vec{r_2}$ : rubbing direction on base plate

P, A : polarization axis direction of polarizer $\alpha^\theta (\theta = 0°, 15°, 30°, 45°)$
$= V^\theta_{10\%} / V^\theta_{90\%}$ $\gamma^{15°, 50\%}_{45°, 90\%} = V^{15°}_{50\%} / V^{45°}_{90\%}$

LIQUID-CRYSTAL COMPOSITION

BACKGROUND OF THE INVENTION

The present invention relates to a liquid-crystal composition and more particularly to a liquid-crystal composition for use in a multiplex-driving system in twisted nematic (TN) type liquid-crystal display devices.

In recent years, a larger information-content has been necessary in the field of liquid-crystal display devices. Accordingly, matrix displays are preferred to conventional segment displays. In a matrix display, the multiplexity (N) in the multiplex driving is increased to 32, 64, or more so as to further diversify the information content.

The drive of a liquid-crystal device of the X-Y matrix type by the optimized amplitude-selecting method of the multiplexity and the ratio $\alpha$ of the effective voltage Vrms (on) in the selected picture-element to the effective voltage Vrms (off) in the non-selected picture-element, is expressed by the well known formula:

$$\alpha = \frac{V_{rms}(on)}{V_{rms}(off)} = \sqrt{\frac{\sqrt{N}+1}{\sqrt{N}-1}}$$

As the N approaches $\infty$ in the formula, $\alpha$ becomes 1. As apparent from this formula, the ratio of Vrms(off) to Vrms(on) should be smaller as the multiplexity N increases. Accordingly, the matrix type liquid-crystal display devices having high information content require a liquid-crystal material to have sharp threshold characteristics, i.e., of superior contrast ratio provided by the small voltage ratio. The threshold characteristics of the conventional liquid-crystal material experienced problems such as low display contrast, narrow effective viewing-angle range, etc. caused when N became a value of 32 or higher.

SUMMARY OF THE INVENTION

The present invention has as its essential object to provide an improved liquid-crystal composition substantially free from the above-described disadvantages.

In order to accomplish this and other objects of the present invention, a primary composition suitable for matrix driving operation is provided.

According to the present invention, there is provided a nematic liquid-crystal composition wherein at least one component or more is selected respectively from group (1) and a (11), and they are simultaneously added to a mixture, where compounds represented by the general formulae

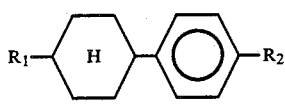
Component (I)

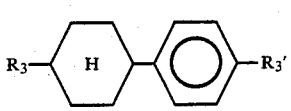
Component (II)

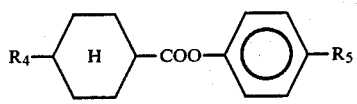
Component (III)

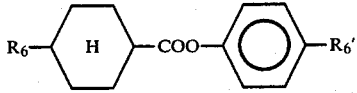
Component (IV)

Component (V)

wherein $R_1$ through $R_8$ depict a straight-chain alkyl group of 1 through 6 in the number of carbon atoms, while $R_3'$ and $R_6'$ depict a straight-chain alkoxy group of 1 through 6 in the number of carbon atoms, are the compound group (1), and compounds represented by the general formulae

Component (VI)

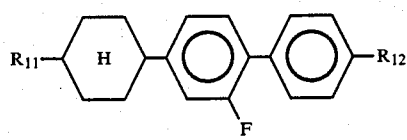
Component (VII)

Component (VIII)

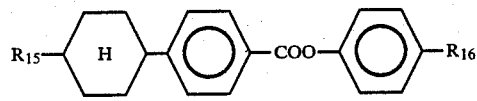
Component (IX)

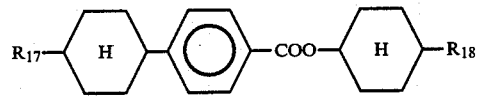
Component (X)

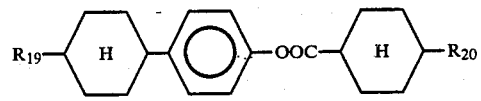
Component (XI)

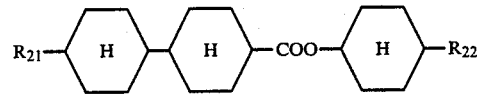
Component (XII)

wherein $R_9$ through $R_{22}$ depict a straight-chain alkyl group of 1 through 10 in the number of carbon atoms, are the compound group (11), in said mixture, which simultaneously contains 2-(4-alkoxyphenyl)-5-alkyl-pyrimidines

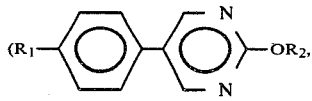

$R_1=C_nH_{2n+1}$, $R_2=C_mH_{2m+1}$, n, m=1 through 12) and cyanobiphenyl compounds.

BRIEF DESCRIPTION OF THE DRAWINGS

These and other objects and features of the present invention will be apparent from the following description taken in conjunction with preferred embodiments thereof with reference to the accompanying drawings, in which.

DETAILED DESCRIPTION OF THE INVENTION

To obtain sharp threshold characteristics in the TN type liquid-crystal display devices, the liquid-crystal composition must be composed of a material which has an elastic constant ratio $K_{33}/K_{11}$ as small as possible, wherein $K_{11}$ is the elastic constant for splay and $K_{33}$ is the elastic constant for bend. The present inventors have found out that 2-(4-alkoxyphenyl)-5-alkylpyrimidines,

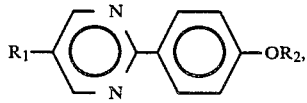

wherein $R_1=C_nH_{2n+1}$, $R_2=C_mH_{2m+1}$, n, m=1 through 12, are the most desirable to achieve the result after the examination of many kinds of compounds. Namely, the elastic constant ratio of phenylcyclohexane series liquid-crystal, biphenyl series liquid-crystal, cyanopyrimidine series liquid-crystal, dioxane series liquid-crystal, ester series liquid-crystal or the like is approximately 1.0 through 2.0, while this material is extremely small (approximately 0.6 in value). The electrooptical characteristics of the TN type liquid-crystal display element using the compound have been examined by the present inventors.

Figure 1A:
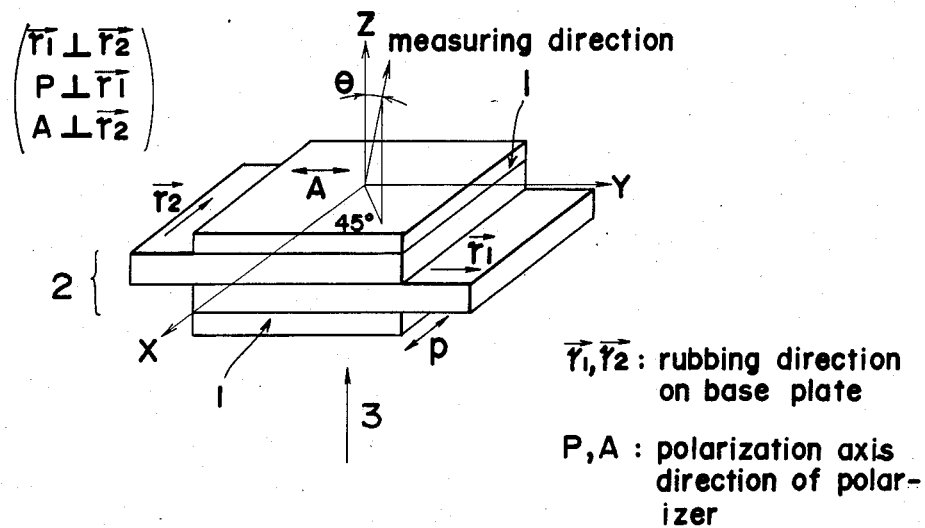
FIG. 1(a) is a perspective view for showing the definition of a measuring direction $\theta$, 1, 2, and 3 thereof indicating a polarizer, a liquid-crystal cell, and incident light, respectively.
Figure 1B:
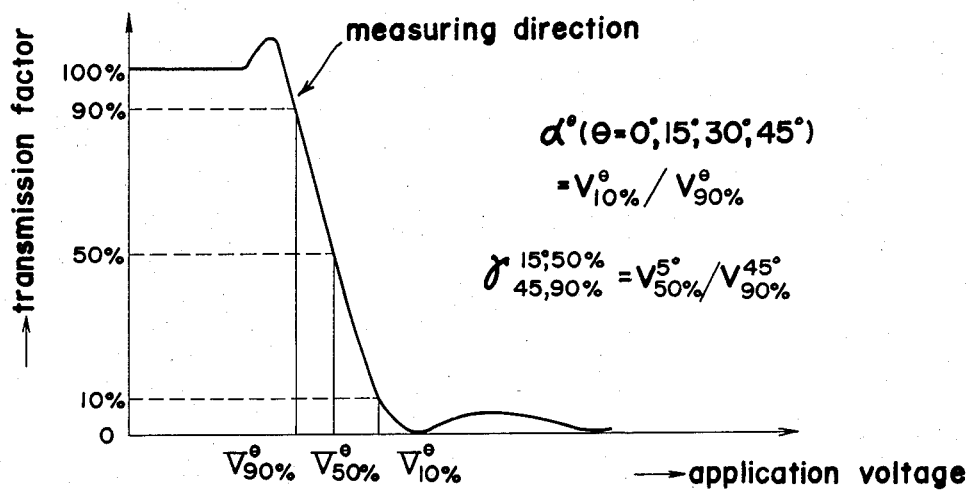
FIG. 1(b) is a graph for showing the definition of $\alpha^\theta$ ($\theta=0°$, 15°, 30°, 45°) and $$\gamma_{45°,\,90\%}^{15°,\,50\%};$$

To exemplify the effectiveness of the pyrimidines, the characteristics of a pyrimidine liquid-crystal mixture of which the composition is shown in Table 1 (hereinafter referred to as composition 1) and the characteristics of conventional materials for matrix driving sold on the market are shown for comparison in Table 2. The ZLI-1701 (produced by E. Merck of West Germany) is mainly composed of phenylcyclohexane series liquid-crystal, the E-90 (produced by BDH Chemicals Ltd. of Great Britain) is mainly composed of ester series liquid-crystal, and the RO-TN-403 (produced by F. Hoffmann-La Roche & Co., Ltd. of Switzerland) is mainly composed of biphenyl series liquid-crystal and cyanopyrimidine series liquid-crystal. The definitions of $V_{90\%}^{0°}$, $\alpha^\theta$ ($\theta=0°$, 15°, 30°, 45°), and $$\gamma_{45°,\,90\%}^{15°,\,50\%}$$

are shown in FIG. 1. As apparent from FIG. 1, the $\alpha^\theta$ are evaluation factors corresponding to the constant characteristics, while the $$\gamma_{45°,\,90\%}^{15°,\,50\%}$$

is an evaluation factor corresponding to the viewing angle characteristics. Both of them should have a small value for better display devices.

The comparison among the liquid-crystal compositions of Table 2, considering the above-described fact, indicates that the composition 1 has, extremely superior characteristics relative to the other liquid-crystal compositions. Also, this fact agrees with examination results of the above-described elastic constant ratio $K_{33}/K_{11}$. It is confirmed by the above-described results that the 2-(4-alkoxyphenyl)-5-alkylpyrimidines are extremely suitable components for use as matrix driving materials.

However, as this material has a smaller ($\Delta\epsilon=\sim 0.6$) dielectric anisotropy represented by a formula of $\Delta\epsilon(\Delta\epsilon=\epsilon_\parallel - \epsilon_\perp$, wherein $\epsilon_\parallel$ is the dielectric constant along the direction parallel to molecular long-axis, and $\epsilon_\perp$ is the dielectric constant along the direction parallel to the molecular short-axis), the threshold voltage, $V_{90\%}^{0°}$, becomes higher as is clear from Table 2. Accordingly, in practical use, the material must be used in combination with compounds having a large positive value of $\Delta\epsilon$, which are called p-type compounds. The present inventors have examined the p-type compounds with respect to their effects on the threshold voltage and electrooptical characteristics when they are used in combination with the pyrimidines. These compounds are collectively shown in Table 3.

TABLE 1

| Composition 1 | |
|---|---|
| Component | Weight % |
| $C_6H_{13}$—[pyrimidine]—[phenyl]—$OC_6H_{13}$ | 16.6 |
| $C_6H_{13}$—[pyrimidine]—[phenyl]—$OC_7H_{15}$ | 16.6 |
| $C_6H_{13}$—[pyrimidine]—[phenyl]—$OC_8H_{17}$ | 16.6 |

TABLE 1-continued

| Composition 1 | |
|---|---|
| Component | Weight % |
| $C_6H_{13}$—[pyrimidine]—[phenyl]—$OC_9H_{19}$ | 16.6 |
| $C_6H_{13}$—[pyrimidine]—[phenyl]—$OC_{10}H_{21}$ | 16.6 |
| $C_6H_{13}$—[pyrimidine]—[phenyl]—$OC_{12}H_{25}$ | 16.6 |

TABLE 2

| | Composition 1 | ZLI-1701 | E-90 | RO-TN-403 |
|---|---|---|---|---|
| $V_{90\%}^{0°}$ (V) | 6.80 | 1.78 | 1.32 | 1.43 |
| $\alpha^{0°}$ | 1.39 | 1.42 | 1.39 | 1.42 |
| $\alpha^{15°}$ | 1.20 | 1.33 | 1.28 | 1.28 |
| $\alpha^{30°}$ | 1.14 | 1.27 | 1.23 | 1.21 |
| $\alpha^{45°}$ | 1.11 | 1.24 | 1.20 | 1.18 |
| $\gamma_{45°,90\%}^{15°,50\%}$ | 1.18 | 1.33 | 1.36 | 1.40 |

TABLE 3

| Abbreviation | Composition | Δε |
|---|---|---|
| No. 1 | $C_3H_7$—[phenyl]—COO—[phenyl]—CN<br>$C_5H_{11}$—[phenyl]—COO—[phenyl]—CN | 27 |
| No. 2 | $C_3H_7$—[H]—[phenyl]—CN<br>$C_5H_{11}$—[H]—[phenyl]—CN | 15 |
| No. 3 | $C_3H_7$—[dioxane]—[phenyl]—CN<br>$C_5H_{11}$—[dioxane]—[phenyl]—CN | 19 |
| No. 4 | $C_3H_7$—[H]—COO—[phenyl]—CN<br>$C_5H_{11}$—[H]—COO—[phenyl]—CN | 21 |
| No. 5 | $C_3H_7$—[phenyl]—[phenyl]—CN<br>$C_5H_{11}$—[phenyl]—[phenyl]—CN | 16 |

Figure 2A:
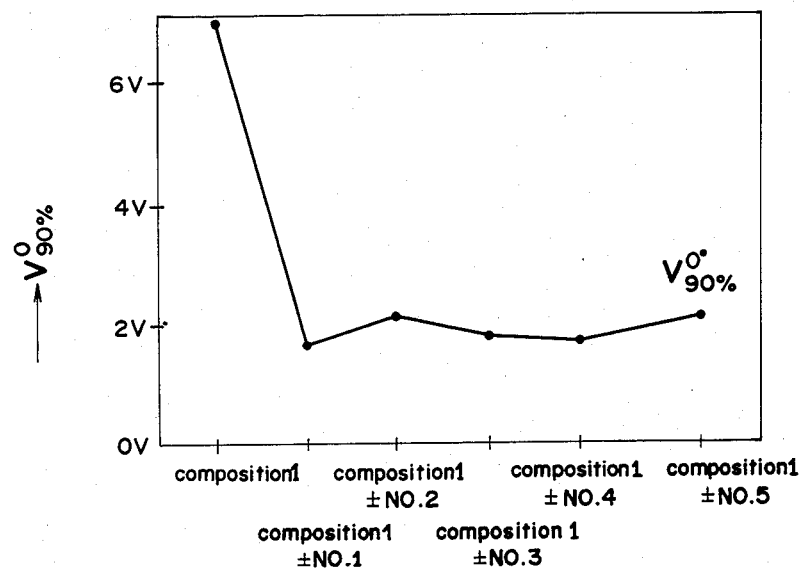
FIGS. 2(a) and (b), are graphs for showing the addition effects of various compounds of positive dielectric anisotropy on electrooptical characteristics.
Figure 2B:
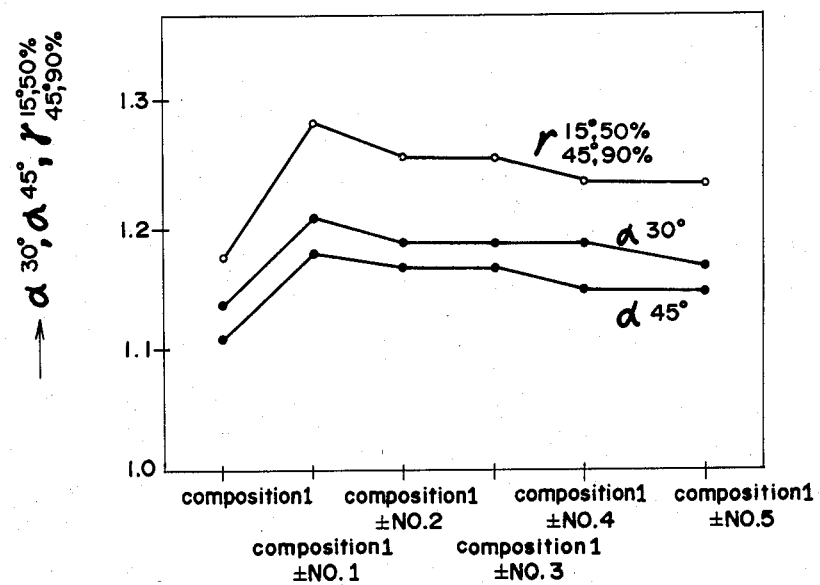

The p-type compositions of No. 1 through No. 5 are mixtures of homologs (propyl and pentyl) mixed in a 1:1 proportion by weight. The threshold voltage ($V_{90\%}^{0°}$), contrast characteristics ($\alpha^{30°}$, $\alpha^{45°}$) and viewing-angle characteristics ($\gamma_{45°,90\%}^{15°,50\%}$) of mixtures wherein these p-type compositions are added to the composition 1 at 20% by weight, respectively, are shown in FIG. 2. It can be determined from the graphs that the threshold voltages are lowered to 3 V or lower due to the addition of the compositions, No. 1 through No. 5, and those threshold voltages can be adjusted to practical values. Also, the contrast characteristics ($\alpha^{30°}$, $\alpha^{45°}$) become better in the order of (bad): No. 1 < No. 2 ≈ No. 3 ≦ No. 4 ≦ No. 5 (good), and the viewing angle characteristics become better in the order of (bad): No. 1 < No. 2 ≈ No. 3 < No. 4 ≈ No. 5 (good). A further comparison between compositions No. 4 and No. 5 in response and recovery times indicates that No. 5 is superior to No. 4 in bringing about faster response and recovery by approximately 15%. It is apparent from the above-described results that composition No. 5 is the most desirable.

Also, according to similar examination on $C_nH_{2n+1}$

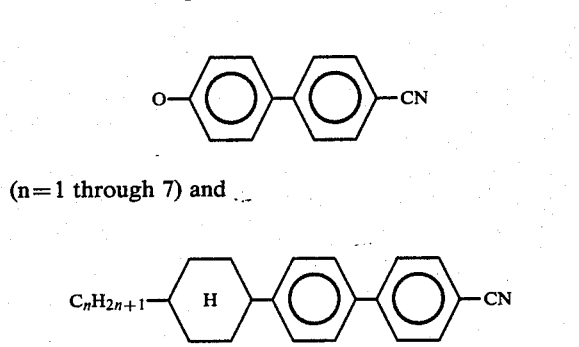

(n=1 through 7) and $C_nH_{2n+1}$—[H]—[phenyl]—[phenyl]—CN (n=1 through 7), which are cyanobiphenyl compounds, similar results as in composition No. 5 are provided. In addition, it is confirmed that similar results are provided about the pyrimidine series compounds

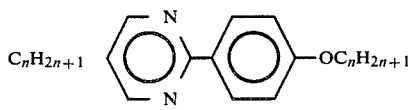

$n=1$ through 5, 7 through 12, $m=1$ through 5), which are different in the number of carbon atoms from composition 1. As apparent from the examination results, the cyanobiphenyl series compounds are most effective as a p-type component to be combined with the 2(4-alkoxyphenyl)-5-alkylpyrimidines.

As these mixtures are, however, as high as approximately 70 through 90 $mm^2 \cdot s^{-1}$ in viscosity at 20° C., they have inferior response characteristics. They also have problems in that undesirable smectic phases arise when the pyrimidine series compounds and the cyanobiphenyl series compounds are mixed, resulting in the narrowing of the nematic temperature range as a mixture. Therefore, these mixtures are not yet sufficient to be practical materials. To solve these problems, other substances to be added thereto are examined.

Firstly, to have the wider nematic temperature range and the lower viscosity of composition, addition of low-viscosity material and high clearing-point material is required. The high clearing-point material is more desirable if the viscosity becomes lower. After the examination of the various compounds and mixed compounds from this point of view, the present inventors have found out through their experiences that the compositions, which have a nematic range from 0° C. through 60° C., and are 35 $mm^2 \cdot s^{-1}$ or lower in viscosity at 20° C., can be provided through various combinations of compounds satisfying the following two conditions as low-viscosity materials, (1) molecular terminal groups are alkyl group or alkoxy groups, and
(2) viscosity ($\eta$) at 20° C. is 20 $mm^2 \cdot s^{-1}$ or lower, and of compounds satisfying the following for conditions as high clearing-point materials, (1) the molecular terminal group are alkyl group or alkoxy groups,
(2) the molecule has at least one cyclohexane ring or more therein,
(3) the molecule does not contain an ester linkage or does not contain two ester linkages or more if it does, and
(4) the clearing point ($T_{cp}$) is approximately 100° C. or higher.

Concrete low-viscosity compounds are as follows.

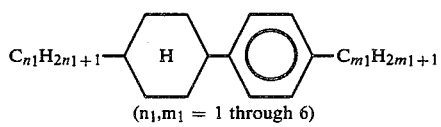

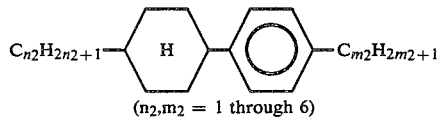

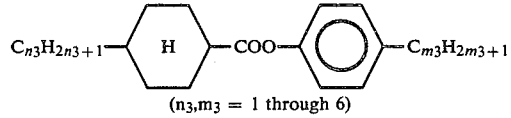

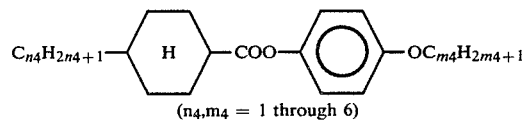

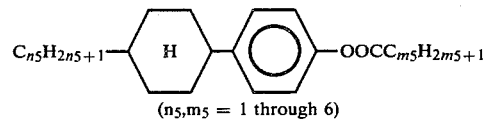

while the high melting-point materials are as follows.

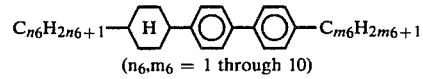

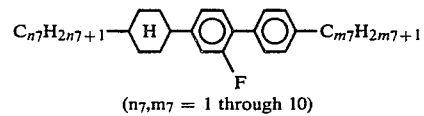

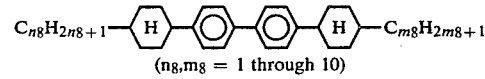

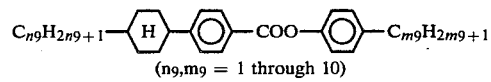

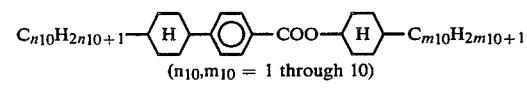

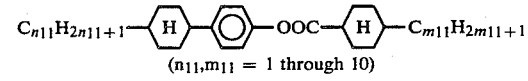

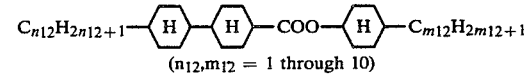

Secondly, the combination of the pyrimidine series compounds and cyanobiphenyl series compounds has a problem in that an undesirable induced smectic phase or the mixed condition of the smectic phase and the other phase, i.e., nematic phase or the like, is likely to arise within the practical temperature range due to the mixture ratio of both compounds. After the examination of the various substances, which prevent the formation of the smectic phase, the present inventors have found out that compounds of the structure

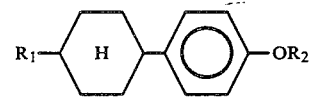

($R_1=C_nH_{2n+1}$, $R_2=C_mH_{2m+1}$ n, $m=1$ through 4) are extremely effective. For example, add, to composition 1 as the pyrimidine series compounds, a liquid-crystal composition (hereinafter referred to as composition 2) wherein

and

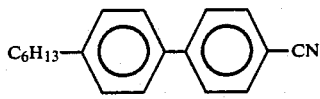

are mixed in a 1:1 proportion by weight, and the smectic phase or a condition where the smectic phase and nematic phase are mixed with each other at room temperature within a range wherein the added amount of the mixture of the latter is approximately 30% through 80%. Add, to the mixture (hereinafter referred to as composition 3) of composition 1 and composition 2 mixed at in a 3:2 proportion by weight, a mixture (hereinafter referred to as composition 4) wherein

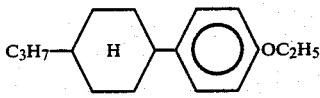

and

Figure 3:
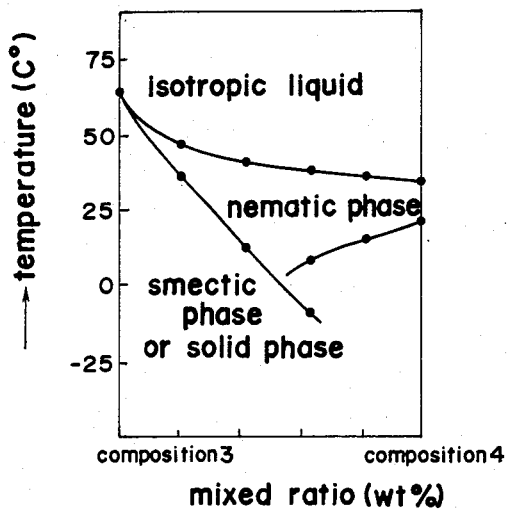
FIG. 3 is a phase diagram for the system of composition 3 and composition 4.

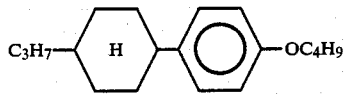

are mixed 1:1 proportion by weight, and the inclination wherein the Tsn (the smectic phase-nematic phase transition temperature) lowers is considerable as shown in FIG. 3. Accordingly, the stable nematic phase is provided at room temperature. Also, similar effects are confirmed when

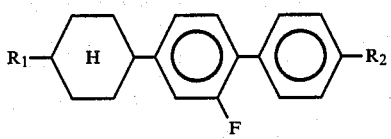

wherein $R_1 = C_nH_{2n+1}$, $R_2 = C_mH_{2m+1}$, n, m = 1 through 7, is used. Such effect is extremely considerable as compared to other substance such as

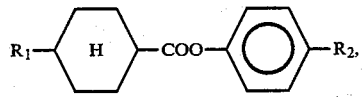

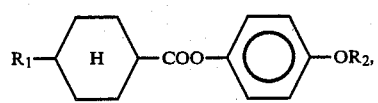

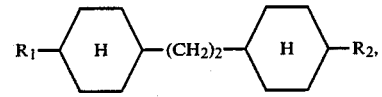

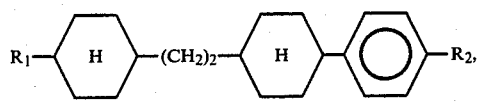

Figure 4:
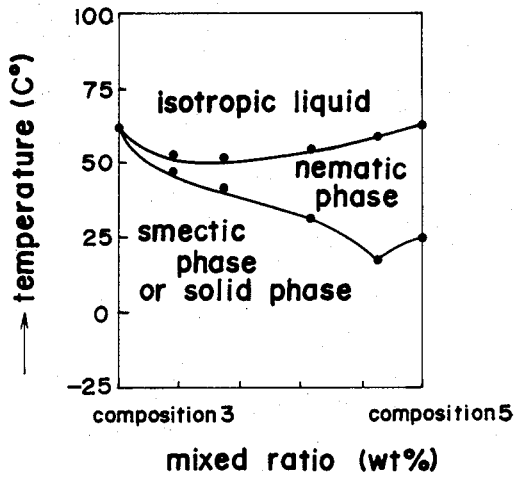
FIG. 4 is a phase diagram for composition 3 and the the composition 5.

($R_1 = C_nH_{2n+1}$, $R_2 = C_mH_{2m+1}$) and the like. FIG. 4 shows an example (hereinafter referred to as composition 5), for comparison, of a mixture of compounds wherein

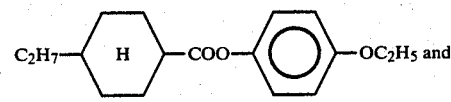

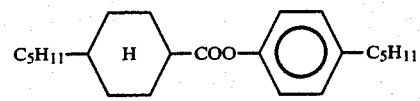

have been mixed in a 1:1 proportion by weight.

As apparent from the above-described results, it is discovered that a compound, which has a structure of

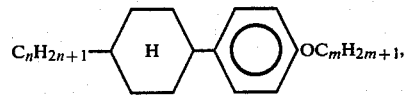

(n, m = 1 through 4) or

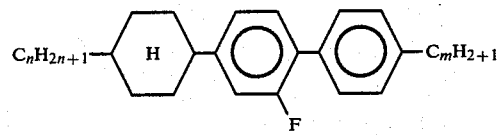

(n, m = 1 through 7), is better used when the undesirable smectic phase arising from the pyrimidine series compound and cyanobiphenyl series compound becomes a problem.

The compositions of the present invention provide mixed liquid-crystal materials which are sufficiently practical in the threshold voltage and nematic temperature range, are are remarkably superior to conventional materials in display characteristics. It is confirmed that the effects are caused when the pyrimidine series compounds and biphenyl series compounds in the mixed liquid-crystal material are respectively 3% or more by weight in content. The embodiments will be shown as follows.

EMBODIMENT 1

A liquid-crystal composition of the present invention will be shown in Table 4.

Heating and mixing operations were conducted until the composition became a transparent liquid under no-pressure to produce a liquid-crystal composition. The liquid-crystal composition was a nematic over a temperature range of from −10° C. to 77° C.

The liquid-crystal composition was sealed into a TN type cell which had beforehand been provided with a twist directional treatment. Measurement was done in a transmissive manner through the TN-cell provided with polarizers on both its sides at location the of crossed nicols. The thickness of the liquid-crystal layer was set at 5.4 μm.

The electrooptical characteristics of the liquid crystal display device using the present embodiment are shown in Table 6 along with those of the conventional liquid-crystal composition of ZLI-1701 shown in Table 2 for comparison.

TABLE 4

| Compounds | Composition ratio (wt %) |
|---|---|
| $C_6H_{13}$—(pyridazine)—(phenyl)—$OC_6H_{13}$ | 5.5 |
| $C_6H_{13}$—(pyridazine)—(phenyl)—$OC_7H_{15}$ | 5.5 |
| $C_6H_{13}$—(pyridazine)—(phenyl)—$OC_8H_{17}$ | 5.5 |
| $C_6H_{13}$—(pyridazine)—(phenyl)—$OC_9H_{19}$ | 5.5 |
| $C_6H_{13}$—(pyridazine)—(phenyl)—$OC_{10}H_{21}$ | 5.5 |
| $C_6H_{13}$—(pyridazine)—(phenyl)—$OC_{12}H_{25}$ | 5.5 |
| $C_2H_5$—(phenyl)—(phenyl)—CN | 6.7 |
| $C_3H_7$—(phenyl)—(phenyl)—CN | 5.4 |
| $C_4H_9$—(phenyl)—(phenyl)—CN | 4.7 |
| $C_5H_{11}$—(H)—(phenyl)—(phenyl)—CN | 4.7 |
| $C_3H_7$—(H)—(phenyl)—$C_2H_5$ | 11.4 |
| $C_3H_7$—(H)—(phenyl)—$OC_2H_5$ | 6.7 |
| $C_3H_7$—(H)—(phenyl)—(phenyl)—$C_2H_5$ | 1.3 |

TABLE 4-continued

| Compounds | Composition ratio (wt %) |
|---|---|
| $C_5H_{11}$—(H)—(phenyl-F)—(phenyl)—$C_2H_5$ | 10.0 |
| $C_3H_7$—(H)—(phenyl)—(phenyl)—(H)—$C_3H_7$ | 2.7 |
| $C_5H_{11}$—(H)—(phenyl)—(phenyl)—(H)—$C_3H_7$ | 4.0 |
| $C_3H_7$—(H)—(phenyl)—COO—(phenyl)—$C_3H_7$ | 5.4 |
| $C_5H_{11}$—(H)—(phenyl)—COO—(phenyl)—$C_3H_7$ | 4.0 |

EMBODIMENT 2

A further liquid-crystal composition of the present invention is shown in Table 5.

Heating and mixing operations were performed until the composition became a transparent liquid under no-pressure at such composition ratio as shown in this table to produce a liquid-crystal composition. The liquid-crystal composition was a nematic over a temperature range of from −10° C. to 73° C.

The characteristics of the liquid-crystal display device using the present embodiment are shown in Table 6. The structure of the display element used here is the same as that described in embodiment 1.

As is apparent from Table 6, the liquid-crystal composition of embodiments 1 and 2 are extremely improved in contrast (α value) and viewing angle (γ value) characteristics as compared with the conventional one, and have no problems in practical use even in threshold voltage and response and recovery times. Accordingly, the usefulness of the present invention in the liquid-crystal composition can be again confirmed. As described hereinabove, the present invention is not restricted to these embodiments.

As the liquid-crystal composition of the present invention is extremely superior in its display characteristics as described hereinabove, it can sufficiently meet the demands to increase the information content of various liquid-crystal display apparatuses of a multiplexing operation at a high-level multiplexing such as character display devices, graphic display devices and the like. The liquid-crystal composition is more useful than the usefulness thereof in half-tone displays especially when it is used in a liquid-crystal television.

TABLE 5

| Compounds | Composition ratio (wt %) |
|---|---|
| $C_6H_{13}$—(pyridazine)—(phenyl)—$OC_6H_{13}$ | 5.5 |

TABLE 5-continued

| Compounds | Composition ratio (wt %) |
|---|---|
| $C_6H_{13}$—[pyrimidine]—[phenyl]—$OC_7H_{15}$ | 5.5 |
| $C_6H_{13}$—[pyrimidine]—[phenyl]—$OC_8H_{17}$ | 5.5 |
| $C_6H_{13}$—[pyrimidine]—[phenyl]—$OC_9H_{19}$ | 5.5 |
| $C_6H_{13}$—[pyrimidine]—[phenyl]—$OC_{10}H_{21}$ | 5.5 |
| $C_6H_{13}$—[pyrimidine]—[phenyl]—$OC_{12}H_{25}$ | 5.5 |
| $C_2H_5$—[phenyl]—[phenyl]—CN | 4.1 |
| $C_3H_7$—[phenyl]—[phenyl]—CN | 4.1 |
| $C_4H_9$—[phenyl]—[phenyl]—CN | 4.3 |
| $C_5H_{11}$—[cyclohexyl]—[phenyl]—CN | 3.5 |
| $C_3H_7$—[cyclohexyl]—[phenyl]—$C_2H_5$ | 8.5 |
| $C_3H_7$—[cyclohexyl]—[phenyl]—$OC_2H_5$ | 5.0 |
| $C_3H_7$—[cyclohexyl]—[phenyl]—$C_2H_5$ | 1.0 |
| $C_5H_{11}$—[cyclohexyl]—[phenyl(F)]—$C_2H_5$ | 7.5 |
| $C_3H_7$—[cyclohexyl]—[phenyl]—[cyclohexyl]—$C_3H_7$ | 2.5 |
| $C_5H_{11}$—[cyclohexyl]—[phenyl]—[cyclohexyl]—$C_3H_7$ | 2.5 |
| $C_3H_7$—[cyclohexyl]—[phenyl]—COO—[phenyl]—$C_3H_7$ | 3.5 |
| $C_5H_{11}$—[cyclohexyl]—[phenyl]—COO—[phenyl]—$C_3H_7$ | 3.5 |
| $C_5H_{11}$—[cyclohexyl]—COO—[phenyl]—$C_5H_{11}$ | 8.5 |
| $C_3H_7$—[cyclohexyl]—[phenyl]—$OC_2H_5$ | 8.5 |

TABLE 6

| | Conventional Example (ZLI-1701) | Example 1 | Example 2 |
|---|---|---|---|
| $V_{90\%}^{0°}$ (V) | 1.78 | 2.41 | 2.64 |
| $\alpha^{0°}$ | 1.42 | 1.38 | 1.36 |
| $\alpha^{15°}$ | 1.33 | 1.24 | 1.23 |
| $\alpha^{30°}$ | 1.27 | 1.19 | 1.16 |
| $\alpha^{45°}$ | 1.24 | 1.16 | 1.14 |
| $\gamma_{45°, 90\%}^{15°, 50\%}$ | 1.33 | 1.25 | 1.23 |
| Tr* (ms) | 6.4 | 11 | 12 |
| Td** (ms) | 20 | 38 | 41 |
| $\eta$ (mm² · s⁻¹) | 15 | 30 | 34 |

*Tr is a response time when the voltage is applied from 0 (V) to $4 \times V_{90\%}^{0°}$ (V).
**Td is a recovery time when the voltage is applied from $4 \times V_{90\%}^{0°}$ to 0 (V).

Although the present invention has been fully described by way of examples with reference to the accompanying drawings, it is to be noted that various changes and modifications will be apparent to those skilled in the art. Therefore, unless such changes and modifications depart from the spirit and scope of the present invention, they should be construed as included therein.

What is claimed is:

1. A mixed nematic liquid-crystal composition comprising:
a 2-(4-alkoxyphenyl)-5-alkylpyrimidine compound of the formula:

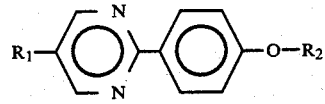

wherein $R_1 = C_nH_{2n+1}$, $R_2 = C_mH_{2m+1}$, n=1-12, and m=1-12;

a cyanobiphenyl compound which is a member selected from the group consisting of:

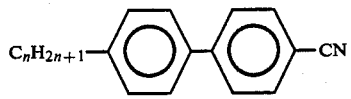

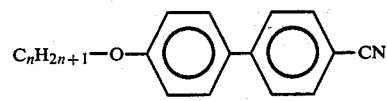

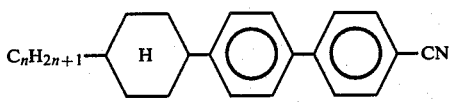

wherein n=1 through 7;

at least one compound which is a member selected from the group consisting of:

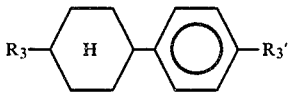

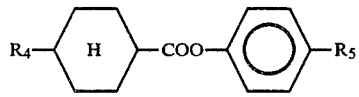

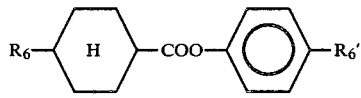

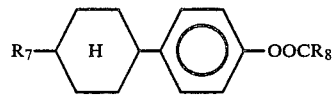

wherein $R_1$ through $R_8$ represent a straight-chain alkyl group having 1 through 6 carbon atoms and $R_3'$ and $R_6'$ represent straight chain alkoxy groups having 1 to 6 carbon atoms;

at least one compound which is a member selected from the group consisting of:

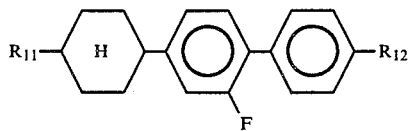

wherein $R_9$ through $R_{14}$ represent a straight-chain alkyl group having 1 through 10 carbon atoms; and at least one compound which is a member selected from the group consisting of:

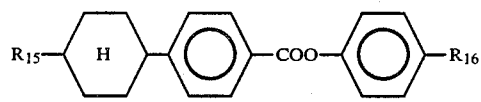

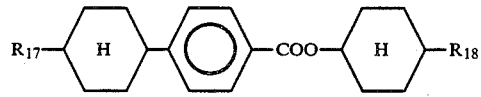

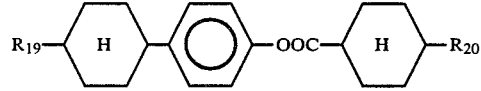

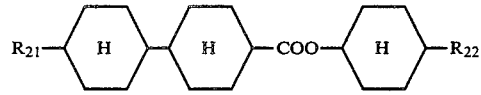

wherein $R_{15}$ through $R_{22}$ represent a straight-chain alkyl group having 1 to 10 carbon atoms.

* * * * *